(12) United States Patent
Jeong et al.

(10) Patent No.: US 9,322,676 B2
(45) Date of Patent: Apr. 26, 2016

(54) WET-LABEL DEVICE FOR ELECTRONIC DEVICE

(71) Applicant: Samsung Electronics Co., Ltd, Gyeonggi-do (KR)

(72) Inventors: Uy-Hyeon Jeong, Gyeonggi-do (KR); Jeong-Min Lee, Seoul (KR)

(73) Assignee: Samusng Electronics Co., Ltd., Suwon-si (KR)

( * ) Notice: Subject to any disclaimer, the term of this patent is extended or adjusted under 35 U.S.C. 154(b) by 324 days.

(21) Appl. No.: 13/827,912

(22) Filed: Mar. 14, 2013

(65) Prior Publication Data

US 2013/0291786 A1 Nov. 7, 2013

(30) Foreign Application Priority Data

May 2, 2012 (KR) .................. 10-2012-0046579

(51) Int. Cl.
*G01D 11/24* (2006.01)
*G01D 7/00* (2006.01)
*G09F 3/00* (2006.01)

(52) U.S. Cl.
CPC .............. *G01D 7/005* (2013.01); *G09F 3/0291* (2013.01)

(58) Field of Classification Search
CPC ............................ G01D 11/24; G01D 11/245
USPC .......................................................... 73/431
See application file for complete search history.

(56) References Cited

U.S. PATENT DOCUMENTS

| | | | |
|---|---|---|---|
| 6,456,487 B1 * | 9/2002 | Hetterick | 361/679.3 |
| 6,628,785 B1 * | 9/2003 | Kitamura et al. | 379/437 |
| 7,455,029 B2 * | 11/2008 | Janesky | 116/200 |
| 8,155,717 B1 * | 4/2012 | Watson | 455/575.3 |
| 8,502,664 B2 * | 8/2013 | Yoshida et al. | 340/545.2 |
| 2001/0040001 A1 * | 11/2001 | Toyooka | 156/233 |
| 2003/0096107 A1 * | 5/2003 | Birkholz et al. | 428/343 |
| 2006/0204709 A1 * | 9/2006 | Chen | 428/68 |
| 2007/0025792 A1 * | 2/2007 | Motoe et al. | 400/472 |
| 2008/0224848 A1 * | 9/2008 | Meyer | 340/517 |
| 2009/0272195 A1 * | 11/2009 | Chouraku et al. | 73/706 |
| 2009/0273480 A1 * | 11/2009 | Mittleman et al. | 340/604 |
| 2009/0274336 A1 * | 11/2009 | Infanti | 381/386 |
| 2013/0222319 A1 * | 8/2013 | Tsurusaki | 345/173 |
| 2013/0242475 A1 * | 9/2013 | Sloey | 361/679.01 |

FOREIGN PATENT DOCUMENTS

JP 2012132872 A * 7/2012

* cited by examiner

*Primary Examiner* — Lisa Caputo
*Assistant Examiner* — Jamel Williams (57) ABSTRACT

An electronic device includes a wet-label device. The wet-label device includes a moisture introduction portion formed in a case of the electronic device, at least one label portions provided in a position adjacent to the moisture introduction portion, and at least one rib portions provided in a position adjacent to the at least one label portions, in which the at least one rib portions guide or block introduction of the moisture to the at least one label portions according to wetness or submersion of the electronic device.

19 Claims, 6 Drawing Sheets

WET-LABEL DEVICE FOR ELECTRONIC DEVICE

CROSS-REFERENCE TO RELATED APPLICATION(S) AND CLAIM OF PRIORITY

The present application is related to and claims the benefit under 35 U.S.C. §119(a) of a Korean Patent Application filed in the Korean Intellectual Property Office on May 2, 2012 and assigned Serial No. 10-2012-0046579, the entire disclosure of which is hereby incorporated by reference.

TECHNICAL FIELD

The present disclosure generally relates to a wet-label device for an electronic device, and more particularly, to a wet-label device for an electronic device, which prevents a label portion from being discolored when the electronic device gets wet and facilitates discoloring of the label portion when the electronic device is submerged.

BACKGROUND

Generally, in any product in which moisture can work as a serious cause for failures of the product including battery packs as well as electronic devices, such as portable communication devices, computers, portable electronic calculators, and the like, a wet-label device is printed thereon. The web-label device includes an ink washed out or discolored when getting wet, such that in repair of a failure, wetness is determined based on the existence or discoloring of the printed portion, thus finding out a cause for the failure.

Figure 1:
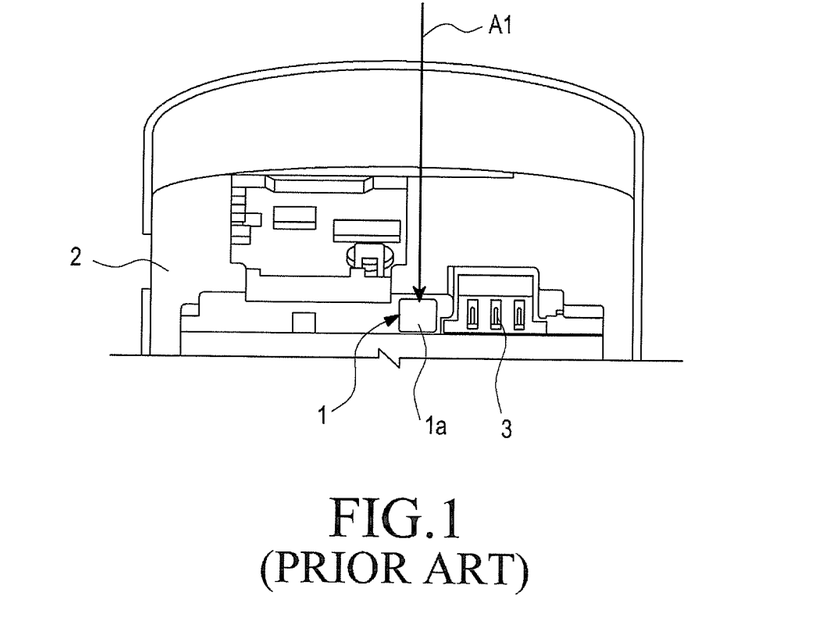
FIG. 1 is a perspective view of a conventional wet-label device of an electronic device.
Figure 2:
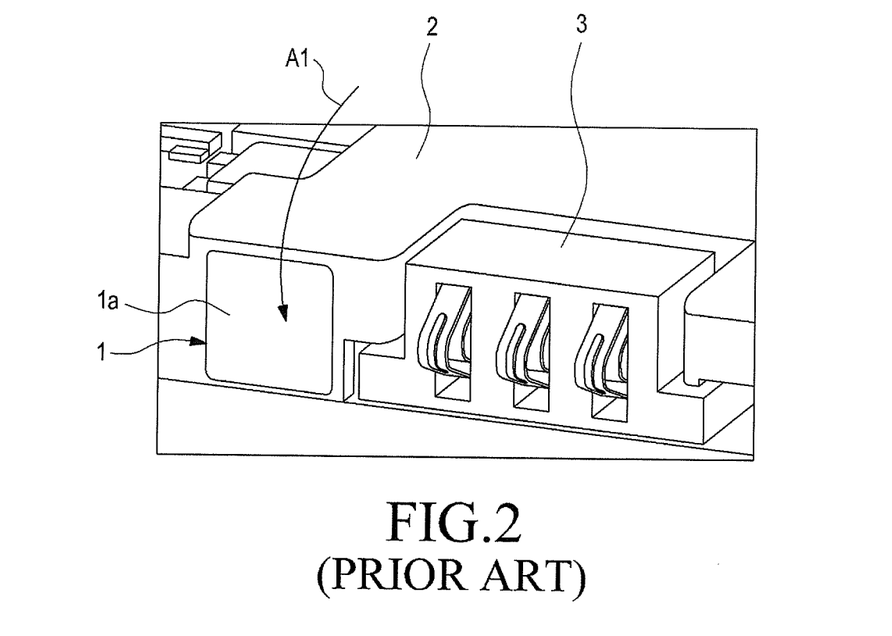
FIG. 2 is an enlarged perspective view of a conventional wet-label device of an electronic device.

As shown in FIGS. 1 and 2, a conventional label device 1 includes a wet label 1a discolored by moisture A1 introduced into an electronic device and a both-side tape (not shown) for adhering the wet label 1a to a body 2 of the electronic device.

When the body 2 of the electronic device has a failure, it can be seen from the discoloring of the wet label 1a that the failure is caused by the moisture A1.

An example wet-label device of an electronic device is disclosed in a Korean Utility Model Registration Gazette No. 20-0233281 (registered on May 25, 2001).

However, a conventional wet-label device of an electronic device may invite a dispute between a user and a seller because when the wet-label device is discolored due to introduction of moisture to the electronic device, a failure caused by simple wetness (e.g., introduction of moisture, such as rainwater, wet hands, etc., and humidity) is not recognized as a user's mistake, but a failure caused by complete submersion is recognized as a user's mistake.

Moreover, in the conventional wet-label device of an electronic device, a wet label is easily damaged by moisture introduced to the electronic device.

Therefore, there is a need for a device capable of quickly and accurately determining whether a cause for a moisture-induced failure of the electronic device is simple wetness or complete submersion.

SUMMARY OF THE INVENTION

To address the above-discussed deficiencies of the prior art, it is a primary object to provide a wet-label device for an electronic device, which guides or blocks introduction of moisture into label portions to prevent the label portions from being discolored when the electronic device gets wet and to facilitate discoloring of the label portions when the electronic device is submerged.

The present disclosure also provides a wet-label device for an electronic device, in which a moisture introduction portion for introducing moisture in case of wetness or submersion in a groove formed on a side of an electronic device's case and in a position adjacent to a hook engagement portion to prevent the moisture introduction portion from being exposed, thereby preventing degradation of exterior quality of the electronic device and making exterior design elegant.

The present disclosure also provides a wet-label device for an electronic device, in which a protection sheet portion for preventing introduction of moisture and protecting the electronic device in case of wetness of the electronic device is provided on a label portion, thereby preventing discoloring and damage of the label portion in case of wetness of the electronic device and improving a function of the label portion in case of submersion of the electronic device.

According to an aspect of the present disclosure, there is provided a wet-label device of an electronic device, the wet-label device including a moisture introduction portion formed in a case of the electronic device, at least one label portions provided in a position adjacent to the moisture introduction portion, and at least one rib portions for guiding or blocking introduction of the moisture to the at least one label portions.

According to another aspect of the present disclosure, there is provided a wet-label device of an electronic device, the wet-label device including a moisture introduction portion formed in a case of the electronic device, at least one label portions provided in a position adjacent to the moisture introduction portion, and at least one rib portions provided in a position adjacent to the at least one label portions, in which the at least one rib portions guide or block introduction of the moisture to the at least one label portions according to wetness or submersion of the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device.

Hereinafter, an exemplary embodiment of the present disclosure will be described in detail with reference to the accompanying drawings. Herein, a detailed description of well-known structures will not be provided not to obscure the subject matter of the present disclosure.

Figure 3:
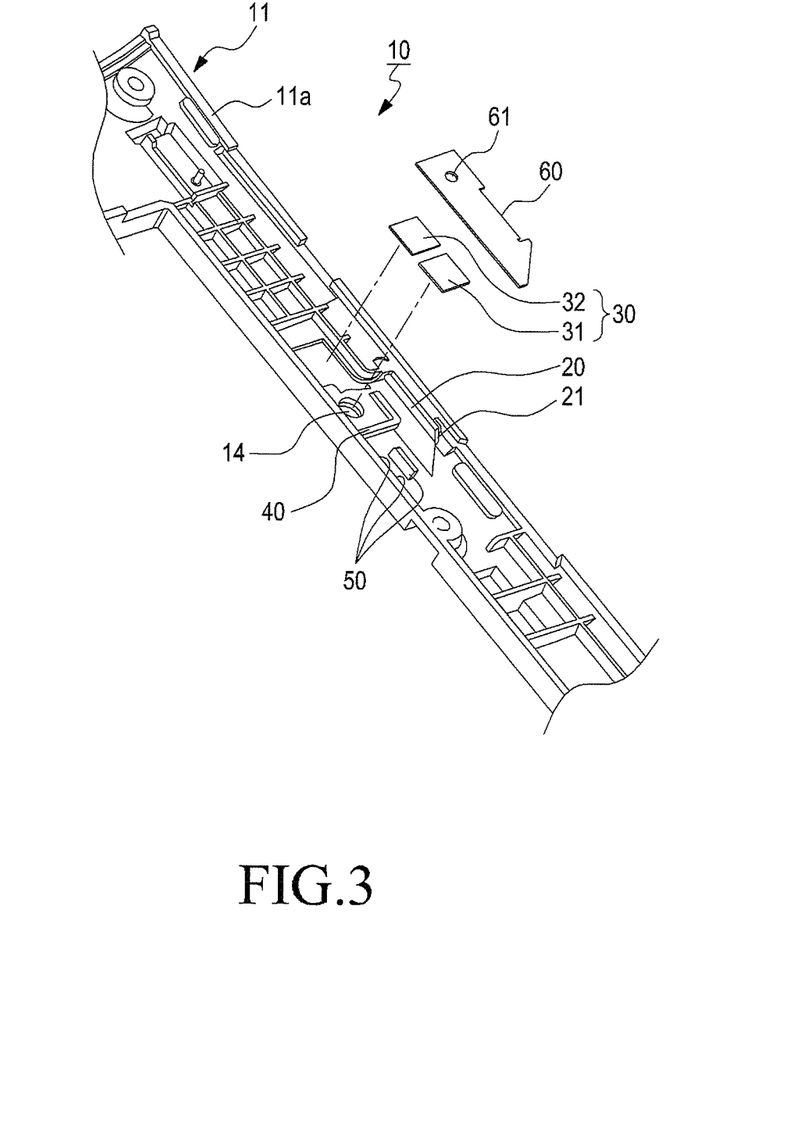
FIG. 3 is an exploded perspective view of a wet-label device of an electronic device according to an embodiment of the present disclosure.
Figure 4:
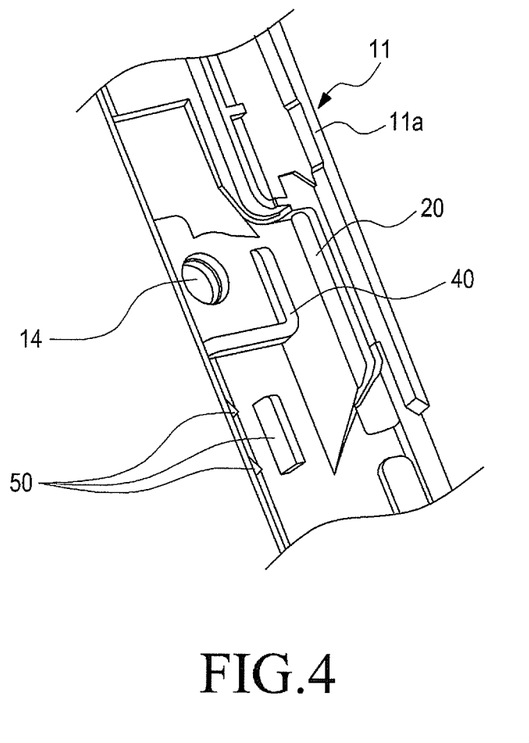
FIG. 4 is an enlarged perspective view of a wet-label device of an electronic device according to an embodiment of the present disclosure.

FIGS. 3 and 4 are diagrams showing a structure of a wet-label device 10 of an electronic device 11 according to an embodiment of the present disclosure.

Referring to FIGS. 3 and 4, the structure of the wet-label device 10 will be described. As shown in FIGS. 3 and 4, the wet-label device 10 includes a moisture introduction portion 20, at least one label portions 30, and at least one rib portions 40. The moisture introduction portion 20 is formed in a case 11a of the electronic device 11 to introduce moisture A1 according to wetness or submersion of the electronic device 11. That is, the moisture introduction portion 20 is preferably formed in a groove (12 in FIG. 7) formed on a side of the electronic device 11 or in a position adjacent to a hook engagement portion (13 in FIG. 7) provided in the electronic device 11. The label portions 30 are provided in a position adjacent to the moisture introduction portion 20 in such a way to face each other, such that they are discolored according to wetness or submersion of the electronic device 11. That is, the label portions 30 are provided not to be discolored in case of wetness of the electronic device 11 and to be discolored in case of submersion of the electronic device 11. The rib portions 40 are provided in a position adjacent to the label portions 30 to guide or block introduction of the moisture A1 into the label portions 30 according to wetness or submersion of the electronic device 11.

Herein, the wet-label device (10 in FIG. 3) according to an embodiment of the present disclosure is applicable to an electronic device as a representative example. However, the wet-label device is not limited to only the electronic device, and is also applicable to various forms of products requiring the wet-label device (for example, vehicles, clothes, foodstuffs, etc.)

Examples of the electronic device include not only mobile communication terminals operating according to communication protocols corresponding to various communication systems, but also any information communication apparatuses and multimedia apparatuses such as Portable Multimedia Players (PMPs), MP3 players, navigation systems, game consoles, notebooks, advertising boards, TVs, digital broadcasting players, Personal Digital Assistants (PDAs), Digital Multimedia Broadcasting (DMB) phones, smart phones, and so forth, and their application apparatuses.

In certain embodiments, the moisture introduction portion 20 includes a moisture introduction hole to facilitate introduction of the moisture A1 upon wetness or submersion of the electronic device 11.

Moreover, as shown in FIG. 4 mentioned before, an end of the moisture introduction portion 20 has a guide inclined surface 21 formed thereon to guide an introduction path and movement of the moisture A1. That is, the guide inclined surface 21 prevents the moisture (A1 in FIG. 8) introduced upon wetness of the electronic device 11 from being gathered in a lower portion of the moisture introduction unit 20 and guides the moisture to allow the moisture to move to a lower portion of the electronic device 11.

Figure 5:
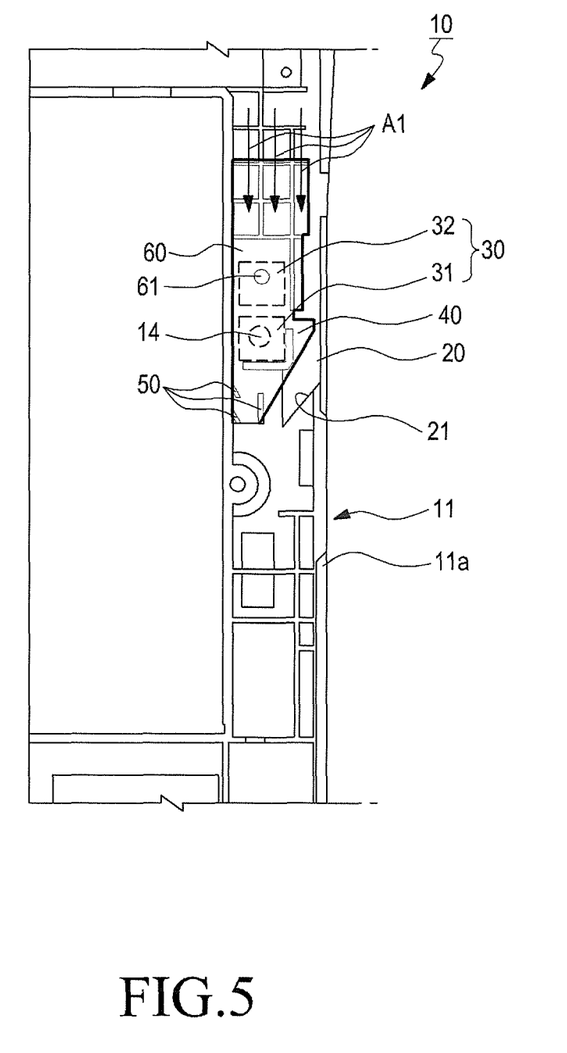
FIG. 5 is a plane view of a protection sheet portion of a wet-label device of an electronic device according to an embodiment of the present disclosure.

In addition, as shown in FIG. 5, the label portions 30 include a first label portion 31 and a second label portion 32. The first label portion 31 is provided on the bottom of a check hole 14 formed in the case 11a of the electronic device 11 to be discolored by the moisture guided by the rib portions 40 when the electronic device 11 is submerged. The second label portion 32 is provided in a position adjacent to the first label portion 31 and under a sheet check hole 61 formed in a protection sheet portion 60 to be additionally discolored together with the first label portion 31 when the electronic device 11 is submerged. That is, the first label portion 31 is discolored to allow submersion of the electronic device 11 to be checked from outside, and the second label portion 32 is discolored together with the first label portion 31, such that when the electronic device 11 is disassembled, the submersion of the electronic device 11 can be more accurately determined. As such, when the first label portion 31 is discolored, submersion can be checked from outside through the check hole 14 formed in the case 11a of the electronic device 11, and to further check the submersion of the electronic device 11, the electronic device 11 is disassembled such that the discoloring of the second label portion 32 can be additionally checked through the sheet check hole 61 of the protection sheet portion 60 attached onto the first label portion 31 and the second label portion 32.

Figure 8:
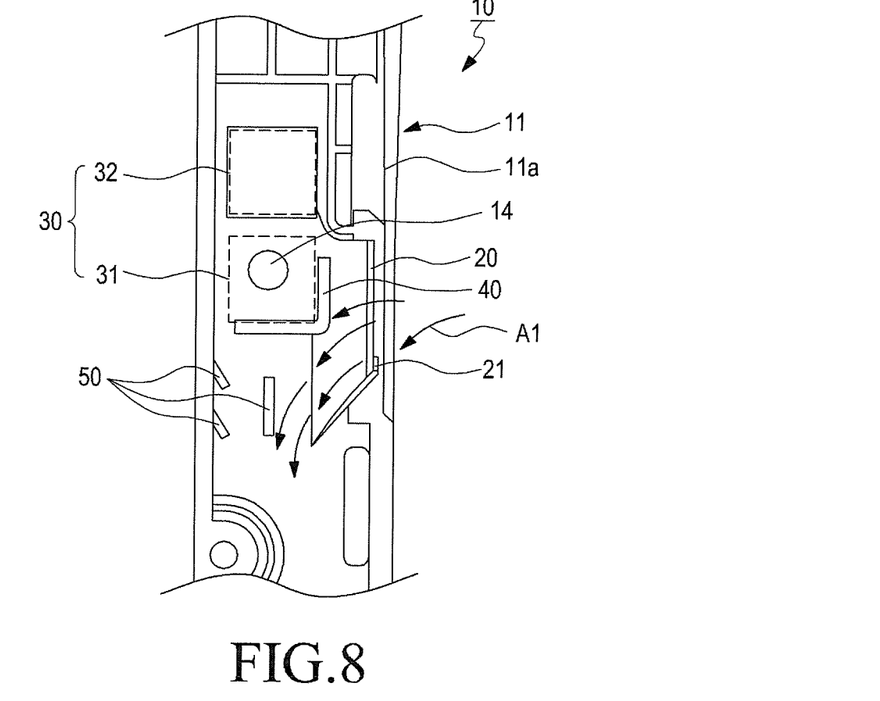
FIG. 8 is a plane view showing an operation state of a wet-label device of an electronic device according to an embodiment of the present disclosure in case of wetness.
Figure 9:
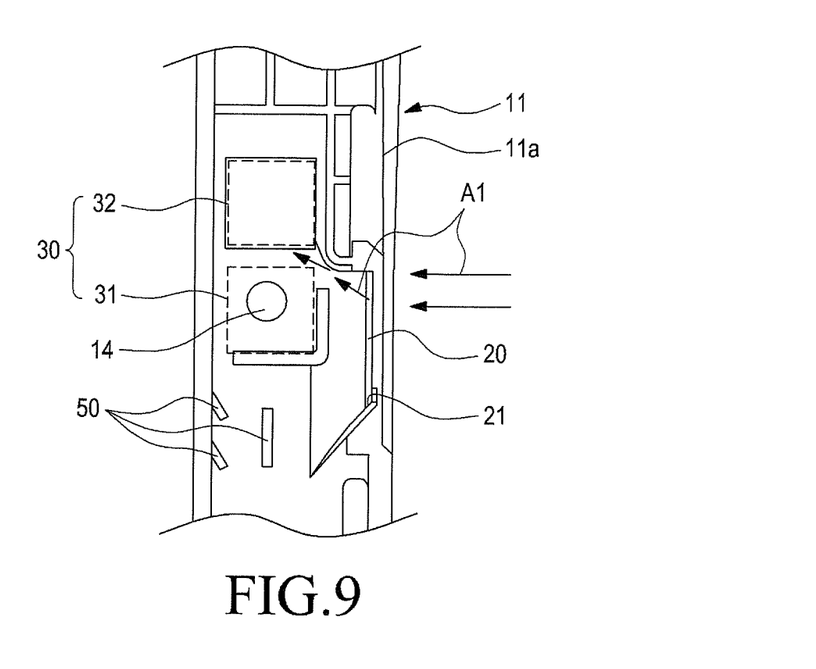
FIG. 9 is a plane view showing an operation state of a wet-label device of an electronic device according to an embodiment of the present disclosure in case of submersion.

As shown in FIGS. 8 and 9, when the electronic device 11 is submerged, the rib portions 40 guide the moisture A1 introduced through the moisture introduction portion 20 to the label portions 30 to discolor the label portions 30; when the electronic device 11 gets wet, the rib portions 40 prevent the moisture A1 introduced through the moisture introduction portion 20 from moving to the label portions 30 to prevent the discoloring of the label portions 30.

The rib portions 40 are preferably "L" shape ribs, and the rib portions 40 can have other shapes than the "L" shape, for example, a "Y" shape, a "V" shape, or the like.

Figure 6:
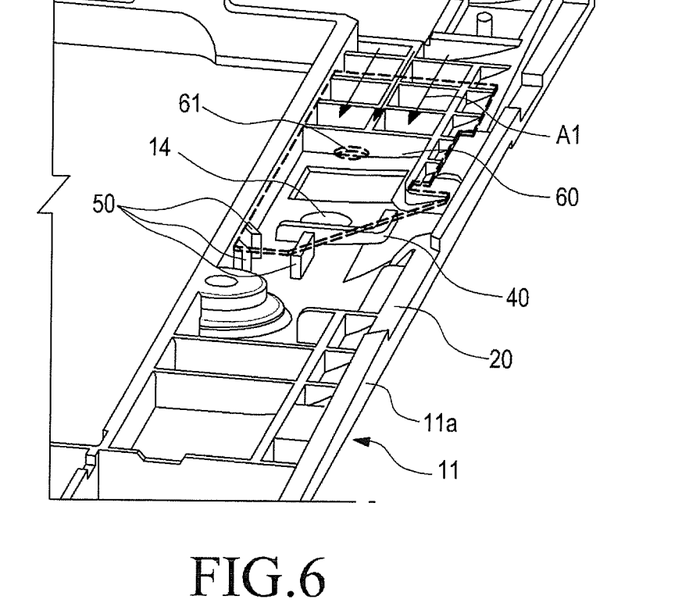
FIG. 6 is a perspective view of a protection sheet portion of a wet-label device of an electronic device according to an embodiment of the present disclosure.

Additionally, as shown in FIGS. 3 and 6 mentioned before, on the label portions 30 are preferably provided the protection sheet portion 60 for preventing introduction of the moisture A1 and protecting the label portions 30 from the moisture A1 when the electronic device 11 gets wet. Moreover, in certain embodiments, the protection sheet portion 60 includes the sheet check hole 61 to externally indicate discoloring of the second label portion 32 when the electronic device 11 is submerged.

In a position adjacent to the rib portions 40 are provided at least one attachment rib portions 50 to guide movement of the moisture A1 and attach the protection sheet 60 when the electronic device 11 gets wet.

In other words, the protection sheet portion 60 is attached on top surfaces of the rib portions 40 and the attachment rib portions 50 to be fixed on the label portions 30.

Figure 7:
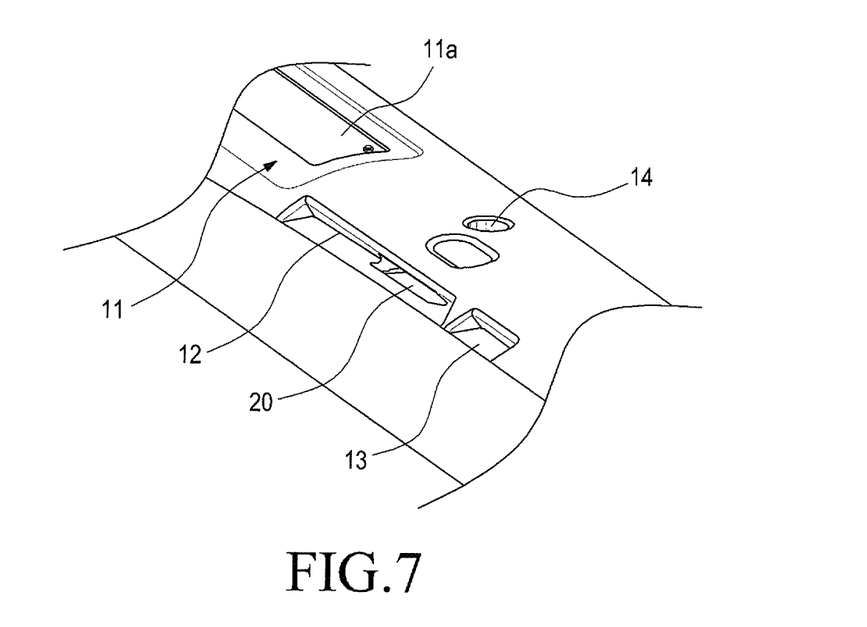
FIG. 7 is a perspective view of a moisture introduction portion of a wet-label device of an electronic device according to an embodiment of the present disclosure.

With reference to the aforementioned FIGS. 3 and 7, a coupling process of the wet-label device will be described. First, as shown in FIG. 7, the groove 12 is formed in a side of the electronic device 11 to form the moisture introduction portion 20, such that the moisture introduction portion 20 including a moisture introduction hole is formed in the groove 12. The groove 12 can be disposed in a position adjacent to the hook engagement portion 13 provided in the electronic device 11. That is, the moisture introduction portion 20 is formed in the groove 12 formed in a side of the case 11 of the electronic device 11 and in a position adjacent to the hook engagement portion 13, thereby preventing the moisture introduction portion 20 from being exposed to outside the case 11a, and thus preventing degradation of exterior quality of the electronic device 11 and making the exterior design elegant. As shown in FIG. 3, the first label portion 31 of the label portion is provided in a position corresponding to the moisture introduction portion 20. Moreover, the first label portion 31 is provided to face the check hole 14 formed in the case 11a of the electronic device 11. The first label portion 31 is provided in the rib portions 40 formed in the case 11a of the electronic device 11. The second label portion 32 is provided in a position adjacent to the first label portion 31. In this state, the protection sheet portion 60 is attached onto the first label portion 31 and the second label portion 32. The second label portion 32 is provided under the sheet check hole 61 formed in the protection sheet portion 60. The protection sheet portion 60 is attached onto the rib portions 40 and the attachment rib portions 50 formed in the case 11a of the electronic device 11.

In this state, an operating process of the wet-label device will be described in more detail with reference to FIGS. 8 and 9. FIG. 8 shows an operation state of the wet-label device in case of wetness, and FIG. 9 shows an operation state of the wet-label device in case of submersion.

As shown in FIG. 8, when the electronic device 11 gets wet, the moisture A1 is introduced into the moisture introduction portion 20 formed in the case 11a of the electronic device 11. The introduced moisture A1 passes through the moisture introduction portion 20 and contacts the rib portions 40, and the rib portions 40 prevent the introduced moisture A1 from contacting the first label portion 31. The rib portions 40 move the introduced moisture A1 to below the first label portion 31. If the introduced moisture A1 is introduced into the first label portion 31, since the protection sheet portion 60 for preventing introduction of the moisture A1 is provided on the first label portion 31 and the second label portion 32, introduction of the moisture A1 to the first label portion 31 and the second label portion 32 and discoloring of the first label portion 31 and the second label portion 32 can be prevented by the protection sheet portion 60.

As shown in FIG. 9, when the electronic device 11, is submerged, the moisture A1 introduced through the moisture introduction portion 20 is guided to the first label portion 31 through the rib portions 40. The guided moisture A1 discolors the first label portion 31 and at the same time, the second label portion 32. That is, the discolored first label portion 31 can be confirmed through the check hole 14 formed in the case 11a of the electronic device 11 without a need to disassemble the electronic device 11, such that the submersion of the electronic device 11 can be confirmed. Moreover, when the case 11a of the electronic device 11 is separated, discoloring of the second label portion 32 can also be confirmed through the sheet check hole 61 of the protection sheet portion 60. Since both the first label portion 31 and the second label portion 32 are discolored, submersion of the electronic device 11 can be confirmed again.

That is, the submersion of the electronic device 11 can be confirmed from discoloring of the first label portion 31 without disassembling the electronic device 11, and to more accurately confirm the submersion of the electronic device 11, the electronic device 11 is disassembled such that discoloring of the second label portion 32 is confirmed through the sheet check hole 61 of the protection sheet portion 60. In this way, the submersion of the electronic device 11 can be accurately determined.

As such, a conventional wet-label device (1 of FIG. 1) is structured such that a wet label (1a of FIG. 1) provided in an electronic device is discolored in case of wetness or submersion regardless of whether the electronic device 11 gets wet or is submerged, making it difficult to accurately distinguish wetness and submersion of the electronic device 11.

To solve the foregoing disadvantage, the wet-label device (10 of FIG. 3) according to the present disclosure blocks moisture (A1 of FIG. 8) introduced in case of wetness of the electronic device (11 of FIG. 8) by means of the rib portions 40, such that the first label portion 31 and the second label portion 32 are not discolored; in case of submersion of the electronic device, the introduced moisture (A1 of FIG. 9) is guided to the first label portion 31 and the second label portion 32 by means of the rib portions 40 and discolors the first label portion 31 and the second label portion 32, such that the submersion of the electronic device (11 of FIG. 9) can be accurately confirmed. Thus, the reliability of distinguishing wetness and submersion of the electronic device can be improved.

It will be obvious to those of ordinary skill in the art that the wet-label device of the electronic device according to the present disclosure described above is not limited by the foregoing embodiment and drawings, and various substitutions, modifications, and changes can be made within the technical scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A wet-label device of an electronic device, the wet-label device comprising:
   a moisture introduction portion formed in a case of the electronic device;
   at least one label portion provided in a position adjacent to the moisture introduction portion;
   at least one rib portion configured to guide or block introduction of moisture to the at least one label portion; and
   at least one attachment rib portion in a position adjacent to the at least one rib portion configured to guide movement of the moisture and attach a protection sheet portion of the at least one label portion when the electronic device gets wet.

2. The wet-label device of claim 1, wherein the moisture introduction portion is formed in a groove formed in a side of the electronic device or is formed in a position adjacent to a hook engagement portion provided in the electronic device.

3. The wet-label device of claim 1, wherein the at least one rib portion guides the moisture to the at least one label portion when the electronic device is submerged, and blocks movement of the moisture to the at least one label portion when the electronic device gets wet.

4. A wet-label device of an electronic device, the wet-label device comprising:
   a moisture introduction portion formed in a case of the electronic device;
   at least one label portion provided in a position adjacent to the moisture introduction portion;
   at least one rib portion provided in a position adjacent to the at least one label portion,
   wherein the at least one rib portion is configured to guide or block introduction of moisture to the at least one label portion according to wetness or submersion of the electronic device; and
   at least one attachment rib portion in a position adjacent to the at least one rib portion configured to guide movement of the moisture and attach a protection sheet portion of the at least one label portion when the electronic device gets wet.

5. The wet-label device of claim 4, wherein the moisture introduction portion is formed in a groove formed in a side of the electronic device or is formed in a position adjacent to a hook engagement portion provided in the electronic device.

6. The wet-label device of claim 4, wherein the moisture introduction portion comprises a moisture introduction hole.

7. The wet-label device of claim 4, wherein an end of the moisture introduction portion has a guide inclined surface thereon to guide an introduction path and movement of the moisture.

8. The wet-label device of claim 4, wherein the at least one label portion comprises:
   a first label portion provided on a bottom of a check hole formed in a case of the electronic device and discolored for indication outside the electronic device when the electronic device is submerged; and
   a second label portion provided in a position adjacent to the first label portion and discolored together with the first label portion for external indication when the electronic device is submerged and thus disassembled.

9. The wet-label device of claim 4, wherein the at least one rib portion guides the moisture to the at least one label portion when the electronic device is submerged, and blocks movement of the moisture to the at least one label portion when the electronic device gets wet.

10. The wet-label device of claim 4, wherein the at least one rib portion comprises "L" shape ribs.

11. The wet-label device of claim 8, further comprising a protection sheet portion on the at least one label portion configured to prevent introduction of the moisture and protect the at least one label portion from the moisture when the electronic device gets wet.

12. The wet-label device of claim 11, wherein the protection sheet portion comprises a sheet check hole to externally indicate discoloring of the second label portion when the electronic device is submerged and disassembled.

13. The wet-label device of claim 4, wherein the protection sheet portion is attached onto top surfaces of the at least one rib portion and the at least one attachment rib portion.

14. A method for providing a wet-label device of an electronic device, the method comprising:
   forming a moisture introduction portion in a case of the electronic device, wherein at least one label portion is provided in a position adjacent to the moisture introduction portion; and
   guiding or blocking introduction of moisture to the at least one label portion,
   wherein the at least one label portion comprises at least one rib portion, and
   wherein the at least one rib portion comprises at least one attachment rib portion to guide movement of the moisture and attach a protection sheet portion of the at least one label portion when the electronic device gets wet.

15. The method of claim 14, wherein forming the moisture introduction portion comprises forming the moisture introduction portion in a side of the electronic device or in a position adjacent to a hook engagement portion provided in the electronic device.

16. The method of claim 14, wherein guiding comprises guiding the moisture to the at least one label portion when the electronic device is submerged, and blocking comprises blocking movement of the moisture to the at least one label portion when the electronic device gets wet.

17. An electronic device comprising:
   a wet-label device comprising:
      a moisture introduction portion formed in a case of the electronic device;
      at least one label portion provided in a position adjacent to the moisture introduction portion; and
      at least one rib portion configured to guide or block introduction of moisture to the at least one label portion; and
      at least one attachment rib portion in a position adjacent to the at least one rib portion configured to guide movement of the moisture and attach a protection sheet portion of the at least one label portion when the electronic device gets wet.

18. The electronic device of claim 17, wherein the moisture introduction portion is formed in a groove formed in a side of the electronic device or is formed in a position adjacent to a hook engagement portion provided in the electronic device.

19. The electronic device of claim 17, wherein the at least one rib portion guides the moisture to the at least one label portion when the electronic device is submerged, and blocks movement of the moisture to the at least one label portion when the electronic device gets wet.

* * * * *